Feb. 24, 1925.  1,527,586
O. F. HUNZIKER
METHOD OF DEODORIZING AND PREPARING CREAM FOR BUTTER MAKING AND THE LIKE
Filed July 27, 1921
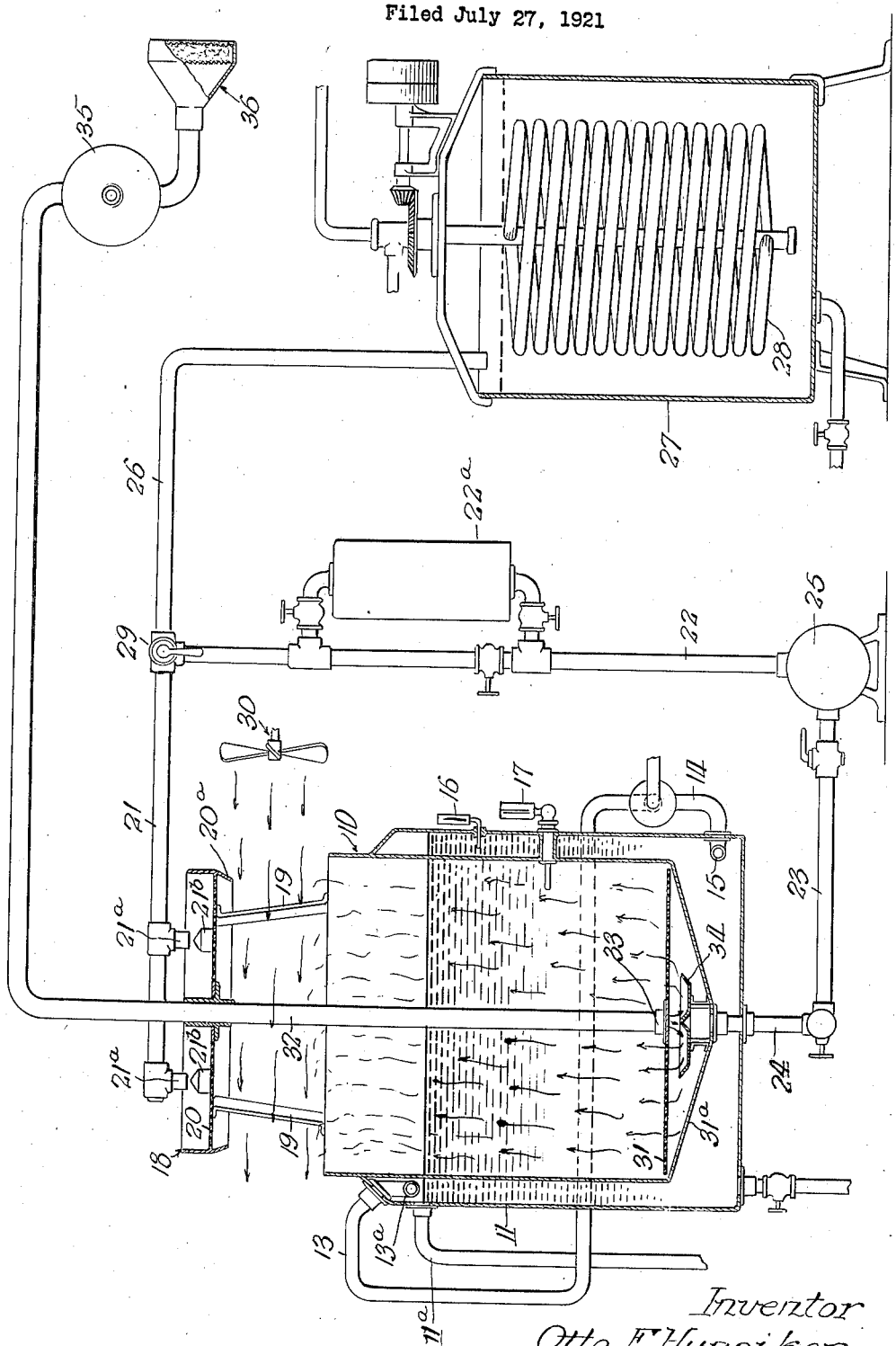
Inventor
Otto F. Hunziker
by Clarence E. Mehlhope Atty.

Patented Feb. 24, 1925.

1,527,586

UNITED STATES PATENT OFFICE.

OTTO F. HUNZIKER, OF LA GRANGE, ILLINOIS, ASSIGNOR TO THE PFAUDLER CO., OF ROCHESTER, NEW YORK, A CORPORATION OF NEW YORK.

METHOD OF DEODORIZING AND PREPARING CREAM FOR BUTTER MAKING AND THE LIKE.

Application filed July 27, 1921. Serial No. 487,912.

*To all whom it may concern:*

Be it known that I, OTTO F. HUNZIKER, a citizen of the United States, and a resident of La Grange, county of Cook, and State of Illinois, have invented certain new and useful Improvements in Methods of Deodorizing and Preparing Cream for Butter Making and the like; and I do hereby declare that the following is a full, clear, and exact description thereof, reference being had to the accompanying drawings, and the letters of reference marked thereon, which form a part of this specification.

This invention relates to a novel and improved process for deodorizing and preparing cream for butter making and other purposes and consists of the matters hereinafter described and more particularly pointed out in the appended claims.

It has been found that cream in some periods of the year, and more particularly in some sections of the country, has an objectionable flavor and odor, such as the flavor and odor of onion or garlic, or of yeast or other volatile flavors and odors which make it objectionable for use in butter making or for other purposes. It has long been attempted to remove such flavors and odors, but so far no commercially practicable process has been found for completely and thoroughly removing such flavors and odors.

The object of my invention is to provide a process capable of being carried on on a commercial scale, for completely and thoroughly removing from cream any and all objectionable volatile flavors and odors so as to leave the cream with only that characteristic flavor and odor which good cream and butter and other dairy products made therefrom should have.

In order to illustrate my process, I submit herewith a drawing illustrating diagrammatically an apparatus which may be used in carrying out my process,—a complete commercial apparatus of the kind forming the subject matter of another application filed of even date herewith.

My process consists, for best results, of three steps, as follows:—first, the preparation of the cream; second, the aeration of the cream in such manner as to completely remove all undesirable volatile flavors and odors; and third, the cooling of the cream in such manner that when cooled, the butter fat content therein is retained in a globular non-crystalline or amorphous state, thus making it possible to manufacture from the cream, butter or other cream products of the desired normal, waxy, or smooth body and texture and entirely free from objectionable mealiness.

The first step of the process, if the cream is acid, includes the standardizing or reducing of the acidity of the cream to a predetermined minimum acid content, so as to avoid the formation of an abnormal curd during other stages of the process. Cream containing acid in excess of about 25/100% to 35/100% by weight of acid,—calculated as lactic acid, would be considered an acid cream. Such reduction or standardization is brought about by the addition of an alkali such as calcium or magnesium oxide, calcium or magnesium hydrate, carbonate of soda, bicarbonate of soda, sodium hydroxide, or other well known alkalies or alkaline earths. The alkali is mixed or dissolved in water and added to the cream in any familiar manner.

Sufficient alkali is added to reduce the acidity to about 25/100% of acid by weight calculated as lactic acid. The percentage may be a little higher or a little lower. In order to make this reduction, the amount of alkali to be added must be determined on the basis to neutralize the acid found in the cream to the point above named, said amount being capable of ready calculation. I have found, however, that the casein in the cream will absorb a certain percentage by weight of the alkali (approximately 20%), the amount thus absorbed being incapable of chemical reaction with the acid in the serous part of the cream and being thus lost as an acid-reducing agent. An excess of alkali therefore to this extent must be added to that actually calculated as required to reduce the acid. Time is an element in the proper acid-reduction of the cream,—several hours being required to complete the reduction.

The cream having been standardized in this fashion, is then heated in a vessel in any suitable manner to a temperature of not less than 140° F. This heating is essential, as by reason of such heating it is made possible to completely remove the undesirable volatile flavors and odors which the cream may contain.

The cream having been thus prepared, is now subjected to the second step of the process which is carried on in the apparatus illustrated in the drawings which it will be well to describe at this point:—

10 indicates an open vat or tank which is surrounded on the sides and bottom by a water jacket 11, supplied with hot water or steam from any suitable source by an inlet pipe 13 entering the jacket space at the top. The water or steam is discharged at $13^a$ in a circumferential direction about the tank 10 and is discharged from the jacket space by an outlet pipe 14 having an orifice 15 directed in such manner as to receive the water or steam as it circulates circumferentially and downwardly about the vat 10 towards the bottom of the jacket space. $11^a$ indicates an overflow discharge pipe opening into the top of the jacket 11.

16, 17 are thermometers respectively let into the jacket space and into the tank for observation of the temperature of the contents thereof. Above the vat is supported a pan 18 by means of legs 19, which leave a substantial space between the bottom 20 of the pan and the top of the vat. The bottom of the pan 20 is perforated, and a pipe 21 discharges by nozzles $21^a$ into said pan,—said nozzles preferably discharging directly upon spreading devices $21^b$, which act to spread the fluid discharged from the nozzles over the bottom of the pan. The pipe 21 is connected by branches 22, 23, with an outlet pipe 24 connected to the bottom of the tank 10. Said pipes and branches are for the purpose of drawing the cream from the bottom of the tank 10 and for discharging it into the pan 18. A pump 25 of suitable construction is interposed in the line for withdrawing the cream and for elevating it to a point above the pan.

The pipe 21 is connected with still another branch pipe 26, which leads to a cooling vat 27, in which is located an agitating and cooling device 28 of familiar construction, by means of which cold water or brine may be circulated through the agitating member so as to at once agitate and cool the contents of the vat 27. A three-way valve 29 controls the flow of the cream in such manner as to direct it through the pipe 21 or through the branch 26.

30 indicates a fan of any suitable construction and driven from any suitable source of power, which is arranged to direct a blast of air across the space between the bottom of the pan 18 and the top of the tank 10. To supplement the action of the fan, a hood (not shown) may be installed in close proximity to the side of the tank 10, directly opposite the fan 30, with a conduit and suction pump to assist in removing the vapors arising from the tank 10. The pan has a conical flange $20^a$ about the bottom to prevent the cream from being blown outwardly beyond the top of the tank 10.

The tank 10 is provided with a false inner perforated bottom 31. 32 indicates a vertical pipe leading down through the pan 18 and through the tank 10 to the bottom thereof where it is connected to a discharge fitting 33, fixed in the center of the perforated false bottom wall 31 of said tank. Located immediately below said discharge fitting but above the real bottom wall $31^a$ of the tank, is a spreading device 34, against which the air discharged through the pipe 32, is forced, and by means of which it is spread in the space below the perforated false bottom 31 so as to direct innumerable sprays of air upwardly through the body of the contents of the vat. 35 indicates a blower which is adapted to force air in large volume through the pipe 32. Said blower must be one capable of withstanding static pressure, since otherwise it will not be possible to force air through the body of cream in the tank 10. The air is preferably drawn into the blower through a filter 36.

With this description of the apparatus, I now proceed with the description of the next step of the process. The heated cream is transferred in any convenient way, as by means of gravity, or by means of a pump to the tank 10.

The pump 25 is put in operation to draw the cream from the tank 10 and to discharge it into the pan, whence it is returned to the tank in the form of fine rain. The blower 35 for supplying air in great volume and under high pressure, is then started and operated in such manner as to force innumerable sprays of air vertically through the perforations in the false bottom 31 and up through the body of cream in the tank 10,—said air sprays, after passing through the body of cream in the tank, ascending then vertically through the descending rain of cream. The falling rain of cream from the pan 18 is treated on its way back to the tank to a cross current of air from the fan or blower 30. In the meantime hot water or steam is supplied through the pipe 13 to the jacket so as to maintain the cream at the required temperature preferably of not less than 140° F. and not above 150° F.

It is important, for the best results, to design the cream pump 25 and the heating arrangements so that the circulation of cream from the tank 10 to the pan 18 and the return thence in rain to the said tank may be maintained at a comparatively rapid rate, say a complete circulation every five minutes, for example,—so that as large a part as possible of the body of cream under treatment may be at all times descending as rain or as a shower, since it is when the cream is in this finely divided state that the odors and flavors are most quickly and efficiently removed by the air. In this condition the butter fat is exposed most effectively to the action of the air and as it is to the butter fat that the strong objectionable odors and flavors cling, such division greatly aids and quickens the removal of such odors and flavors.

On account of the great volume of air required to pass through the cream, (preferably a volume in excess of one-fifth of a cubic foot per gallon of cream per minute) and as it is difficult to heat such a volume of air sufficiently to prevent it from lowering the temperature of the cream below the required temperature, it is expedient to apply heating means additional to that given by the steam or water in the jacket; to this end I prefer to interpose in one of the branches of the pipe 21 (as shown in the branch 22) a bypass connected with a flash pasteurizer 22ª or other heating device, by means of which the mean temperature of the cream will be raised, and the desired temperature thus maintained.

In the continuous circulation of the cream from the tank to the pan and from the pan back to the tank as described, the cream is subjected to a continuous process of double aeration; first, by the air blown up through the body of the cream, and second, by the air blown through the rain of cream descending from the pan 18. The air jets, after they escape above the surface of the body of cream, rise through the descending rain of cream and the horizontally directed stream of air passes transversely across the descending rain of cream.

This step of the process is continued until all objectionable volatile flavors and odors are removed from the cream. This may be determined by tests made from time to time. The time required will depend upon the nature and degree of the flavor and odor to be extracted, and will ordinarily require from about 15 minutes to an hour's time. It is important that the temperature should be maintained throughout the operation of this step of the process, as the more objectionable odors can not be successfully removed except at that temperature.

The rain from the pan 18 obviates or prevents excessive foaming on the surface of the cream in the tank 10, which would otherwise occur by reason of the violent agitation produced by the air jets forced through the body of the cream.

The air supplied by the blower 35 is preferably heated and said air may, when it is possible to heat it sufficiently, be used to assist or aid in maintaining the cream in the tank 10 at the desired temperature.

After the aeration step is completed, the cream, while still hot, is directed into the vat 27, wherein it is subjected to the third step of the process, namely, that of cooling it. In the first stage of the cooling process, for purposes of economy, ordinary city water may be used to circulate through the agitating member 28, and the use of such water may be continued until the cream has been reduced to a temperature of about 100° F. At this point, and from this temperature, until the cream has been reduced to the temperature of about 65° to 70° F., the cooling process must be carried on with great rapidity, so that the drop between the said two temperatures may be brought about with the utmost speed. I therefore at the temperature of 100°, pass through the agitator, brine at say 10° F., until the temperature of the cream has been reduced to 70° F. or below.

During the entire process of cooling the body of cream is continuously and violently agitated by means of the rotary agitator 28 or by other suitable means.

By agitating the cream in this way, the butter fat is prevented from "oiling off" and the fat globules are thereby maintained in their globular state, so that when the cream is churned to produce butter, or is otherwise treated for other purposes, the product has a smooth, waxy body and texture and is free from mealiness and other objectionable defects in texture.

The critical temperatures above referred to are first, the melting point of butter fat, which is between about 100° and 95° F., and second, the solidifying point of cream which is between about 70° and 65° F. If the cream is cooled slowly between these two temperatures, crystallization of the butter fat will occur, with the result that when the cream is used for making butter or ice-cream or other purposes, the product will have an objectionable mealy body. The rapid cooling of the cream from the melting point of butter fat to the solidifying point as above described, prevents the formation of the crystallization and produces an amorphous solidification which represents that condition of the cream conducive to the waxy, smooth body desired in butter and ice-cream and other cream products.

The cooling of the cream may also be done, if desired, in whole or in part by circulating cold water or brine through the water jacket 11 of the tank 10, before the cream is transferred to the vat 27, or by passing the cream from the tank 10 to the vat 27 through the pasteurizer 22ª and circulating cold water or brine through the jacket of the pasteurizer or by a combination of both ways.

I claim as my invention:—

1. The process of treating cream for the purpose described consisting in heating the cream to a relatively high temperature, subjecting the cream in finely divided state to successively repeated treatments of aeration by blowing air in large volume through the finely divided particles of cream, maintaining the supply of heat to the cream to maintain its temperature during such aeration and continuing such heating and aeration for a variable period until the objectionable flavors and odors have been substantially removed.

2. The process of treating cream for the purpose described consisting in heating a batch of cream to a temperature of substantially 140° to 150° F., repeatedly breaking up all portions of said batch into a state of fine subdivision and passing and repassing the subdivided particles through a current of air to aerate the same, maintaining the supply of heat to the cream to maintain said temperature thereof, and continuing such simultaneous heating, and aeration of the batch for a variable period until the objectionable volatile flavors and odors have been substantially removed.

3. The process of treating cream for the purpose described, which consists in passing and repassing the cream through the air in the form of a spray or fine rain, at the same time maintaining the cream at a predetermined high temperature and in blowing currents of air in large volume through the spray or rain of cream, said currents of air being directed at an angle to each other, and the treatment being continued until all objectionable volatile flavors and odors have been substantially removed.

4. The process of treating cream for the purpose described, which consists in rapidly circulating cream by withdrawing it from a container and returning it thereto in the form of spray or rain which passes through the air and is directed upon the surface of the cream in the container; in maintaining the cream in circuit at a predetermined high temperature, in blowing air in large volume in a plurality of fine jets spaced at near intervals through the body of cream and through said spray; and in blowing a current of air through said rain or spray at an angle to the direction of said rain or spray,—the treatment being continued until the objectionable volatile odors and flavors have been substantially removed.

5. The process of treating cream for the purpose described, which consists in rapidly and continuously circulating a body of cream by withdrawing it from a container and returning it thereto in the form of spray or fine rain which is passed through the air and is directed to fall upon the surface of the cream in the container; in maintaining the cream in circuit at a predetermined high temperature; in violently agitating the cream in the container, and in subjecting the cream in the container and the cream in the form of spray of rain to currents of air in large volume,—the treatment being continued until the objectionable volatile flavors and odors have been substantially removed.

6. The process of treating cream for the purpose described, which consists in rapidly and continuously circulating a body of cream by withdrawing it from a container and returning it thereto in the form of spray or fine rain which is passed through the air and is directed to fall upon the surface of the cream in the container; in maintaining the cream in circuit at a predetermined high temperature; in violently agitating the cream in the container; in subjecting the cream in the container to a blast of air in large volume directed therethrough in a plurality of jets or sprays spaced at near intervals; and in subjecting the spray or rain of cream to cross currents of air,—the treatment being continued until the objectionable volatile flavors and odors have been substantially removed.

7. The process of treating cream for the purpose described, which consists in reducing the cream to a pre-determined acidity; then heating the cream to a predetermined high temperature; in subjecting the cream at that temperature to a process of aeration in which the cream is continuously withdrawn from an open container and returned thereto through the air in the form of a fine spray or rain, at the same time forcing air in fine jets spaced at near intervals through the body of cream in the container and blowing air transversely through the spray or rain of cream on its way to the container; in maintaining the predetermined high temperature of the cream throughout the aeration process and continuing said process until the cream is completely deodorized; and then cooling said cream rapidly through the temperatures ranging from the melting point of butter fat to the point of solidification,—continuously agitating the cream during the cooling process.

8. The process of treating cream for the purpose described, which consists in heating the cream to a predetermined high temperature; in subjecting the cream at that temperature to a process of aeration in which the cream is continuously withdrawn from an open container and returned thereto through the air in the form of fine spray or rain, at the same time forcing air in fine jets spaced at near intervals through the body of cream in the container and blowing air transversely through the spray or rain of cream on its way to the container; in maintaining the predetermined high temperature of the cream throughout the aeration process and continuing said process until the cream is completely deodorized; and then cooling said cream rapidly through the temperatures ranging from the melting point of butter fat to the point of solidification,—continuously agitating the cream during the cooling process.

9. The process of treating cream for the purpose described consisting in heating the cream to a temperature substantially higher than animal heat, repeatedly passing the cream in a state of fine subdivision through a substantial current of air to intensively aerate the particles, continuing the supply of heat and aeration for a variable period until the objectionable flavors and odors have been removed, and subsequently simultaneously agitating and cooling the cream rapidly below the melting point of butter fat to maintain the amorphous state of the latter and the smooth consistency of the cream.

10. The process of treating cream for the purpose described consisting in adding to a batch of cream a sufficient quantity of an alkali in excess of that absorbed by the casein to reduce the acidity to a predetermined degree, heating said batch to a temperature substantially between 140° to 150° F., passing and repassing the batch in a finely divided state through a substantial current of air to intensively aerate the same, continuing the heating and aeration of the batch for a variable period until the objectionable flavors and odors have been removed, and subsequently simultaneously agitating and cooling the cream rapidly below the melting point of butter fat to maintain the smooth consistency of the cream.

In testimony that I claim the foregoing as my invention, I affix my signature in the presence of a witness, this 15 day of July, A. D. 1921.

OTTO F. HUNZIKER.

Witness:
T. H. ALFREDS.